April 15, 1969  A. FISCHER  3,438,276
DIVIDED HUB
Filed Feb. 1, 1966  Sheet 1 of 3

INVENTOR.
ARTUR FISCHER
BY Michael S. Striker

April 15, 1969 A. FISCHER 3,438,276
DIVIDED HUB
Filed Feb. 1, 1966 Sheet 2 of 3
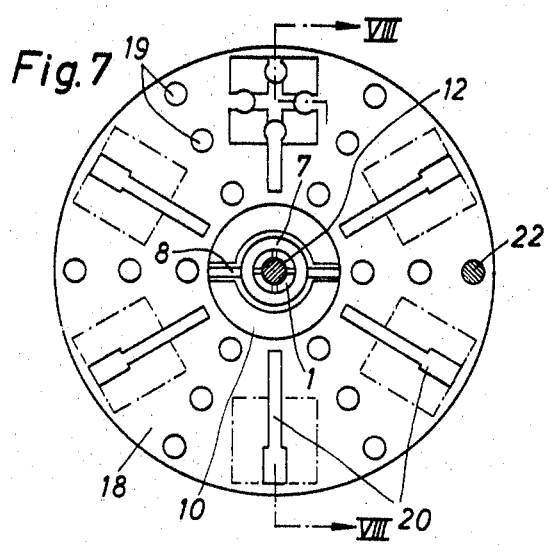
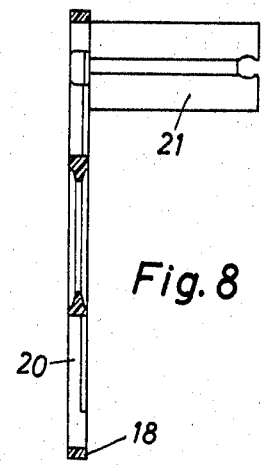
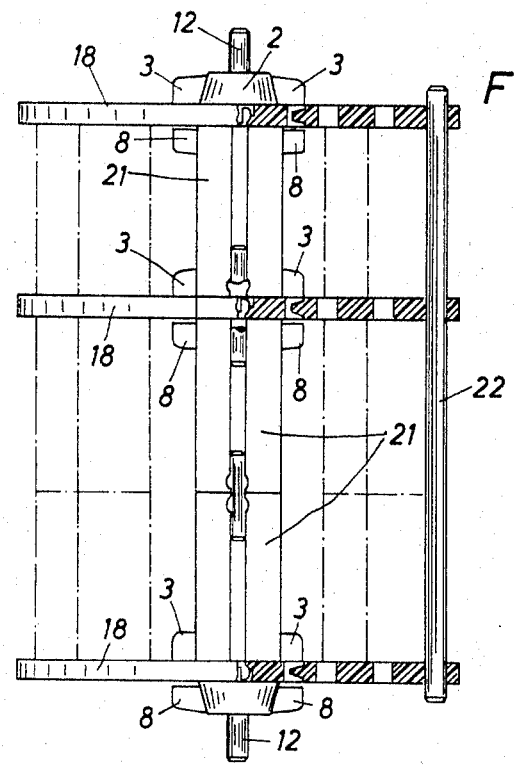
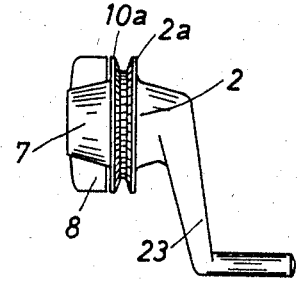
INVENTOR.
ARTUR FISCHER April 15, 1969  A. FISCHER  3,438,276
DIVIDED HUB
Filed Feb. 1, 1966
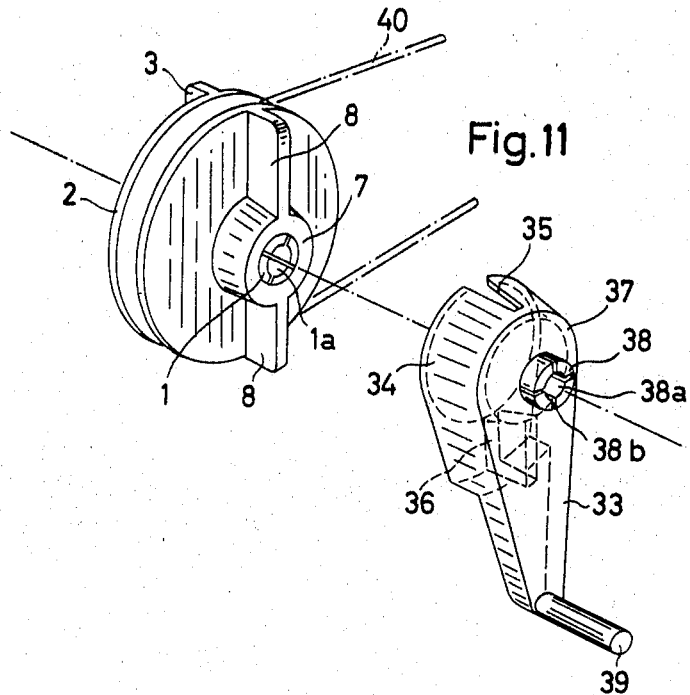
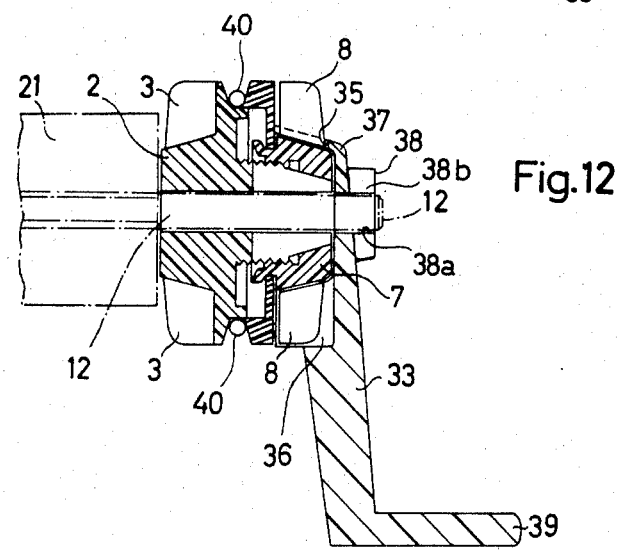
INVENTOR.
ARTUR FISCHER

United States Patent Office 3,438,276
Patented Apr. 15, 1969

3,438,276
DIVIDED HUB
Artur Fischer, Tumlingen, Kreis Freudenstadt, Germany
Filed Feb. 1, 1966, Ser. No. 524,337
Claims priority, application Germany, Feb. 15, 1965,
F 45,245; July 8, 1965, F 46,557
Int. Cl. F16h *55/38;* F16d *1/08;* B60b *27/06*
U.S. Cl. 74—230.4                    7 Claims

ABSTRACT OF THE DISCLOSURE

A divided hub for removably supporting wheels, gears, chains or the like comprises at least two coaxial hub parts which are formed with cooperating screw threads threadedly connected with each other. At least one of the hub parts carries a disc member which consists of resiliently deformable material and which is so positioned as to undergo resilient deformation in response to being subjected to axially directed stresses which develop when the screw threads are caused to matingly engage.

---

The present invention relates to a divided hub, especially for use in mechanical building toys for removably connecting wheels, gears, discs, chains, Caterpillar tracks or the like to a shaft.

It is an object of the present invention to provide for a divided hub suitable for the above purpose in which the parts of the divided hub can easily be connected and disconnected from each other.

It is an additional object of the present invention to provide for a divided hub suitable for the above purpose in which the parts of the hub will properly center themselves one on the other when the same are connected to each other.

It is a further object of the present invention to provide for a divided hub for the above mentioned purpose, in which the parts of the hub not only can be connected easily to each other, but in which the parts of the hub are constructed also in such a manner that during the connection of the hub parts to each other one of the hub parts may also be fixedly clamped onto a shaft for rotation therewith and against displacement in axial direction.

With these objects in view, the divided hub according to the present invention for removably supporting wheels, gears, or chains or the like on a shaft mainly comprises at least two coaxial hub parts formed with cooperating screw threads threadingly connected with each other. Preferably one of the parts is formed with a coaxial conical portion and the other part with a corresponding conical cavity in which said cone portion is located. The one part is formed with a coaxial bore extending through this part and the conical portion thereof and the conical portion is preferably formed with a plurality of slots extending radially therethrough so that when the cooperating screw threads of the two hub parts are engaged and tightened the slots through the conical portion of the one part will be narrowed, whereby a shaft extending through the bore will be tightly clamped in the conical portion of the one part. At least the conical portion of the one hub part is formed from slightly flexible material and preferably both parts are formed from plastic material.

In order to facilitate proper tightening of the cooperating screw threads, at least one of the parts is in the form of a wing nut or both parts may be provided with radially extending wings on the outer surface thereof. In order to properly center the two parts with respect to each other, one of the parts is preferably provided with a centering rim engaging in a corresponding cavity in the wheel may be mounted between the other part and the other part.

The divided hub may also include a disc coaxial with one of the parts and turnably mounted thereon on a portion thereof facing the other part so that a rubber disc whereby the one part may be freely turned with respect to the other part to tighten the cooperating screw threads without hampering of the turning movement by the rubber wheel which frictionally engages the other part and the disc.

The divided hub may also include crank means either integrally formed with one of the parts or, removably connectable to one of the parts of the hub.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 is a side view similar to FIG. 6 and showing spacer blocks connected to the disc;

FIG. 8 is a cross section taken along the line VIII—VIII of FIG. 7;

FIG. 9 is a partially sectioned top view of a plurality of hubs each carrying a disc as shown in FIG. 7 and connected to each other to form a drum;

FIG. 10 is a side view of a divided hub in which one part thereof is integrally connected to a crank;

FIG. 11 is an exploded perspective view of a hub and crank means removably connectable to the hub for rotation therewith; and FIG. 12 is an axial cross section through the arrangement shown in FIG. 11 with the crank means connected to the hub.

Figure 1:
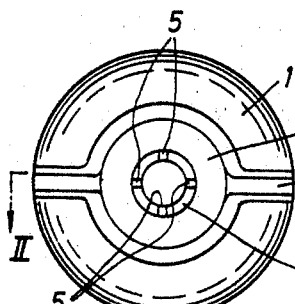
FIG. 1 is a side view of a hub according to the present invention.
Figure 2:
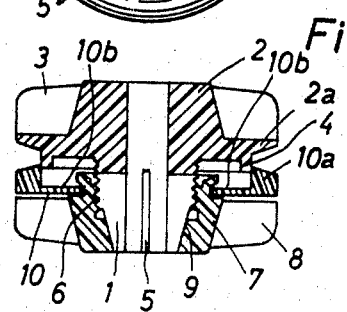
FIG. 2 is a cross section taken along the line II—II of FIG. 1.

Referring to the drawings, and more specifically to FIGS. 1 and 2 of the same it will be seen that the divided hub according to the present invention includes two coaxial hub parts 2 and 7. The hub part 2 has a disc portion 2a and a coaxial conical portion 1 projecting to one side of the disc portion 2a whereas a pair of wings 3 respectively project in radial direction and to the other side of the disc portion 2a. The hub part 7 is formed with substantially conical coaxial cavity 9 in which the conical portion 1 of the hub part 2 extends engaging with the outer surface thereof the inner surface of the cavity 9. The conical portion 1 is provided at its larger diameter end with an outer screw thread 6 and the hub part 7 is provided with a corresponding inner screw thread threadingly connected with the screw thread 6. The hub part 2 is formed with a central bore which extends also through the conical portion 1 thereof and the conical portion 1 is provided with a plurality of slots 5 extending in radial direction outwardly of the bore so that when the cooperating screw threads are engaged and tightened, the slots 5 will be narrowed so that the inner surface defining the bore through the conical portion may be tightly pressed against a shaft extending through the bore.

The divided hub preferably includes a disc 10 turnably mounted on a portion of the hub part 7 facing the hub part 2 and the disc 10 preferably has an annular enlarged shoulder portion 10a having an annular surface inclined at an acute angle to the axis of the bore through the hub portion 2, facing an oppositely inclined annular surface on the disc portion 2a and forming with the other inclined surface a substantially V-shaped groove, the width of which may be changed within certain limits by screwing the two hub parts 2 and 7 to a lesser or greater extent into each other. An annular centering rim 4 is integrally formed with the hub part 2 extending into a corresponding cavity formed by the inner surface of the shoulder portion 10a on the disc 10. The outer cylindrical surface of the centering rim 4 may be serrated and engage a correspondingly serrated inner cylindrical surface on the shoulder 10a so as to securely connect the disc 10 and the hub part 2 against rotation with respect to each other. The hub part 7 preferably has also a pair of wings 8 radially extending therefrom. The oppositely inclined surfaces defining the V-shaped groove between the disc 10 and the disc part 2a of the hub part 2 may be roughened or provided with serrations to positively engage a part located in the V-shaped groove. The disc 10 may also be omitted and in this case the hub part 7 is provided with an appropriate cavity in which the centering rim 4 of the hub part 2 may be located.

Figure 3:
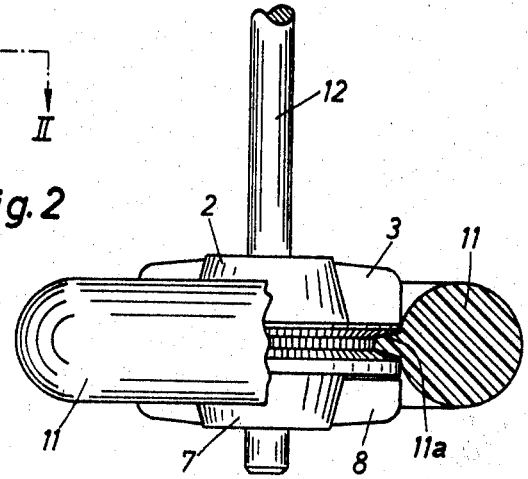
FIG. 3 is a partially sectioned top view of the hub shown in FIGS. 1 and 2 and showing the mounting of a rubber wheel on this hub.

FIG. 3 illustrates the use of the hub for mounting a rubber wheel 11. As shown in FIG. 3 the rubber wheel 11 is provided with an inner rim 11a of trapezoidal cross section which is engaged in the groove between the disc part 2a of the hub part 2 and the shoulder portion 10a of the disc 10. In this arrangement the part 7 of the divided hub may easily be tightened or loosened while the annular rim portion 11a is tightly squeezed between the disc portion 2a of the part 2 and the shoulder portion 10a of the disc 10, whereby the friction created between the rubber wheel 11 and the aforementioned portions will not prevent easy rotation of the hub part 7 since the disc 10 is turnably mounted on the hub part 7. The shaft 12 is extended through the bore in the hub and depending on the tightening of the part 7 on the conical portion of the part 2, the hub may be tightly clamped on the shaft 12 or surrounding the latter freely rotatable with respect thereto.

Figure 4:
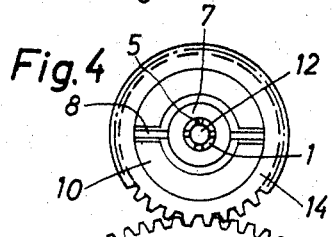
FIG. 4 is a side view drawn to a smaller scale and showing two hubs to each of which a gear is connected which gears mesh with each other.

FIG. 4 shows an arrangement in which a pair of meshing gears 13 and 14 are mounted on a pair of hubs according to the present invention which are respectively mounted on spaced and parallel shafts 12.

Figure 5:
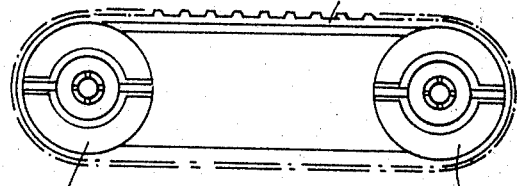
FIG. 5 is a side view of two hubs likewise drawn to a smaller scale, arranged spaced from each other and serving to support a Caterpillar track.

FIG. 5 illustrates a Caterpillar track or chain 15 mounted in the V-shaped grooves of a pair of divided hubs 16 and 17.

Figure 6:
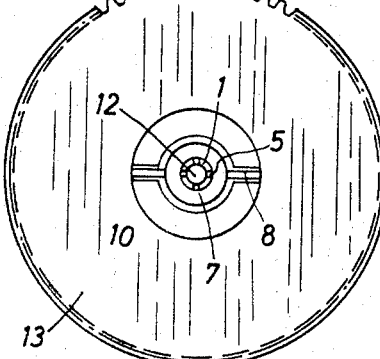
FIG. 6 is a side view of a hub drawn to a smaller scale and illustrating a disc connected to the hub.
Figure 6:
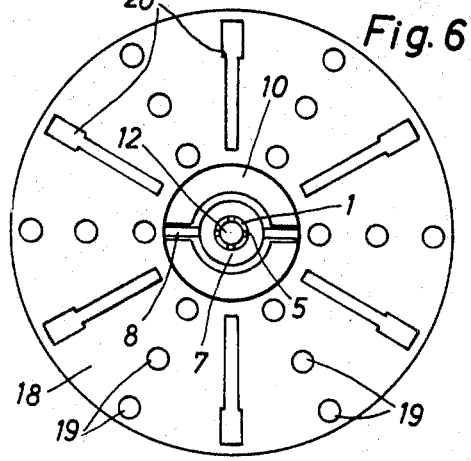

FIG. 6 illustrates the use of a hub according to the present invention mounted on a shaft 12 and supporting between the parts thereof a disc 18 provided with a plurality of bores 19 and a plurality of elongated slots 20.

FIGS. 7–9 illustrate the use of a plurality of divided hubs and discs 18 connected thereto as shown in FIG. 6 for building a toy drum in which the plurality of discs 18 carried by the hubs are connected to each other by building blocks 21 and rods 22 as shown especially in FIG. 9. The FIGS. 7–9 illustrate only the use of the hubs according to the present invention for building elements of toys and of course, as illustrated in FIGS. 3–5, the hubs of the present invention may be used also for many different purposes.

FIG. 10 shows a further embodiment of a divided hub and the embodiment shown in FIG. 10 differs from that shown in FIG. 1 in that a crank 22 is integrally connected with the hub part 2 instead of the wings 3 as shown in the embodiment of FIG. 2.

FIGS. 11–12 show a further embodiment in which the divided hub is provided with a crank means, but in this embodiment the crank means is removably connected to the divided hub. As clearly shown in FIG. 11 the crank means comprises an annular wall portion 34 adapted to surround the outwardly protruding portion of the hub part 7 and being formed with a pair of oppositely arranged slightly tapering slots 35 and 36 into which the wings 8 of the hub part 7 are adapted to fit when the crank means are placed against the latter. The annular wall portion 34 is closed by a transverse wall portion 37 which is extended into a crank arm 33, and a crank pin 39 integral therewith projects from the lower end of the crank arm 33. A bearing collar 38 projects centrally and outwardly from the transverse wall portion 37 and the bearing collar 38 is provided with a central bore 38a therethrough which extends likewise through the transverse wall portion 37 and is adapted to be aligned with the bore 1a formed through the conical portion of the hub part 2 and through the latter so that a shaft 12 mounted in a building block 21 may extend through the bore 1a and the corresponding bore 38a of the crank means, as shown in FIG. 12, whereby the wings 8 of the hub part 7 respectively extend through the slots 35 and 36 of the crank means so that the latter is coupled to the divided hub for rotating the latter during turning of the crank means. The bearing collar 38 is preferably provided with a plurality of slots 38b therethrough so as to form from the bearing collar a plurality of resilient portions and the bore 38a is preferably slightly tapered so that the resilient portions of the bearing collar 38 will tightly engage the end portion of the shaft 12. The assembly of the divided hub and the crank means mounted thereon as shown in FIG. 12 may be used to drive a non-illustrated component through a rope 40 placed in the V-shaped slot of the divided hub.

The various components of the divided hub as well as the crank means are preferably molded from tough plastic material.

It will be understood that each of the elements described above, or two or more together, may also find a useful application in other types of divided hubs differing from the types described above.

While the invention has been illustrated and described as embodied in a divided hub formed from plastic material for use in toys or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A divided hub for removably supporting annular elements, comprising at least two coaxial hub parts provided with cooperating screw threads and being threadedly connected with each other, said hub parts comprising respective disc portions one of which is a discrete disc portion turnably mounted on the respective hub portion, said disc portions defining with one another a circumferential groove adapted to receive and retain an inner marginal zone of an annular element; and means for aligning one of said disc portions in radial direction of said hub parts with respect to the other of said disc portions.

2. A divided hub as defined in claim 1, said means comprising an annular centering rim provided on one of said disc portions, and a corresponding cavity in which said centering rim is received on the other of said disc portions.

3. A divided hub as defined in claim 2, said centering rim being provided with an outer serrated peripheral surface and said cavity being provided with a corresponding serrated inner circumferential surface, whereby said disc portions are locked together against relative rotary displacement when the serrations of the respective surfaces engage one another in response to entry of said centering rim into said cavity.

4. A divided hub as defined in claim 1, at least one of said disc portions being at least slightly resiliently deflectable in response to axially directed stresses developing upon relative axial displacement of said hub parts in a sense threading the same together.

5. A divided hub as defined in claim 1, said disc porportions having respective annular faces extending from the periphery thereof and being inclined with reference to one another so that said groove is of substantially V-shaped cross-sectional configuration.

6. A divided hub as defined in claim 1, said hub parts each comprising a hub portion coaxial with the respective disc portion, one of said hub portions being conical and the other having a complementary recess into which said one hub portion is insertable, and said one hub portion and at least one of said disc portions being resiliently deformable in response to stresses developing upon relative axial displacement of said hub parts in a sense inserting said one hub portion deeper into said recess of the other hub portion.

7. A divided hub as defined in claim 6, wherein said one hub portion is provided with a plurality of slots extending radially therethrough and subdividing it into a plurality of resilient tongues.

References Cited

UNITED STATES PATENTS

| | | | |
|---|---|---|---|
| 2,105,317 | 1/1938 | Frank | 301—63 XR |
| 2,566,663 | 9/1951 | Hollerith | 301—63 XR |
| 904,341 | 11/1908 | Lindstrom | 287—52.06 XR |
| 1,800,981 | 4/1931 | Beste. | |
| 2,307,747 | 1/1943 | Pfueger. | |
| 2,452,742 | 11/1948 | Franzene. | |
| 2,639,621 | 5/1953 | Harris et al. | 287—52.06 XR |
| 3,003,149 | 10/1961 | Grashow. | |
| 3,076,668 | 2/1963 | Famely | 287—52.06 XR |
| 3,250,148 | 5/1966 | Soles. | |
| 3,321,863 | 5/1967 | Maxam | 46—221 |

FRED C. MATTERN, JR., *Primary Examiner.*

JAMES A. WONG, *Assistant Examiner.*

U.S. Cl. X.R.

287—53; 301—63